(No Model.)

L. HILL.
CORSET STEEL FASTENING.

No. 311,987. Patented Feb. 10, 1885.

Witnesses.
Henry Marsh.
W. H. Systin.

Inventor.
Lucian Hill
by Crosby & Gregory
Attys

UNITED STATES PATENT OFFICE.

LUCIAN HILL, OF NORTH BROOKFIELD, MASSACHUSETTS, ASSIGNOR TO THEODORE C. BATES, OF SAME PLACE.

CORSET-STEEL FASTENING.

SPECIFICATION forming part of Letters Patent No. 311,987, dated February 10, 1885.

Application filed September 5, 1884. (No model.)

*To all whom it may concern:*

Be it known that I, LUCIAN HILL, of North Brookfield, county of Worcester, State of Massachusetts, have invented an Improvement in Corset-Steel Fastenings, of which the following description, in connection with the accompanying drawings, is a specification, like letters on the drawings representing like parts.

This invention has for its object the production of a novel fastening for corset-steels.

In other devices heretofore employed the yielding portion of the fastening has been the eye-piece; but in this my present invention the stud, or a part thereof, is made to expand and contract under the action of the eye-piece.

My invention consists, essentially, in a corset-steel provided with an eye-piece combined with a steel provided with an expansible stud.

Figure 1:
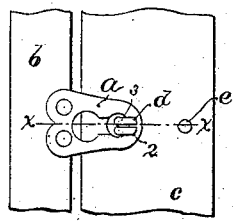
Figure 2:
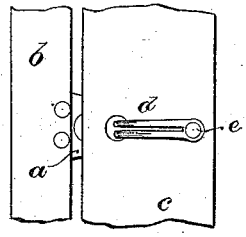
Figure 3:
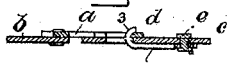
Figure 4:
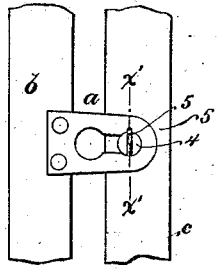
Figure 5:

Figure 1 represents a portion of a pair of corset-steels having my improved fastenings attached; Fig. 2, an under side view thereof; Fig. 3, a section of Fig. 1 in the line $x$ $x$; Figs. 4 and 5, respectively, top view and section of a steel, representing a modified form of stud or peg; and Fig. 6 is a section of Fig. 5 in the line $x^2$ $x^2$.

The eye-piece $a$, of usual construction, is attached to the steel $b$. The steel $c$ has attached to it the expansible stud or peg $d$, which is engaged by the eye-piece.

In Figs. 1 to 3 the stud or peg is composed of a piece of sheet metal bent to form a stud or peg having two prongs, 2 3, connected with the under side of steel $c$ by means of a rivet, $e$, the upwardly and backwardly turned ends of the said piece of sheet metal passing through a hole in the said steel.

Figure 6:
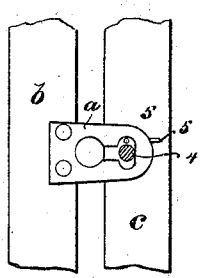

In the modification, Figs. 4 to 6, the stud or peg is composed of a headed stud, 4, and a spring, 5, applied to the said stud, so as to move toward and from the center line of the said stud in the direction of the length of the steel. In both plans the stud or peg contracts or closes together as the narrow part of the eye-piece comes in contact with it, or as the stud or peg is made to travel in the slot of the eye-piece from its inner to its outer end, the stud or peg thereafter expanding in the enlarged outer end of the slot.

I do not desire to limit my invention to the exact construction of expansible stud or peg, as the same may be variously modified without departing from my invention.

I claim—

A corset-steel provided with an attached eye-piece, combined with a corset-steel having an attached expansible stud which is contracted by the eye-piece when inserted therein, and thereafter expands to hold the eye-piece and steels securely engaged, substantially as described.

In testimony whereof I have signed my name to this specification in the presence of two subscribing witnesses.

LUCIAN HILL.

Witnesses:
F. W. RUGGLES,
H. H. FAIRBANKS.